US010982019B2

(12) United States Patent
Saeed et al.

(10) Patent No.: US 10,982,019 B2
(45) Date of Patent: Apr. 20, 2021

(54) PROCESS FOR CATALYST DEACTIVATION

(71) Applicant: BOREALIS AG, Vienna (AT)

(72) Inventors: Irfan Saeed, Helsinki (FI); Katri Nikkilä, Espoo (FI); Kalle Kallio, Porvoo (FI)

(73) Assignee: BOREALIS AG, Vienna (AT)

( * ) Notice: Subject to any disclaimer, the term of this patent is extended or adjusted under 35 U.S.C. 154(b) by 233 days.

(21) Appl. No.: 16/311,255

(22) PCT Filed: Jun. 22, 2017

(86) PCT No.: PCT/EP2017/065395
§ 371 (c)(1),
(2) Date: Dec. 19, 2018

(87) PCT Pub. No.: WO2017/220724
PCT Pub. Date: Dec. 28, 2017

(65) Prior Publication Data
US 2019/0330389 A1 Oct. 31, 2019

(30) Foreign Application Priority Data

Jun. 23, 2016 (EP) ..................................... 16175998

(51) Int. Cl.
C08F 2/00 (2006.01)
C08F 2/38 (2006.01)
C08F 4/6592 (2006.01)
C08F 6/02 (2006.01)
C08F 2/06 (2006.01)

(52) U.S. Cl.
CPC .................. C08F 6/02 (2013.01); C08F 2/06 (2013.01); C08F 2/38 (2013.01); C08F 4/65925 (2013.01); C08F 2410/05 (2013.01)

(58) Field of Classification Search
CPC ............. C08F 2/00; C08F 2/38; C08F 4/6592
See application file for complete search history.

(56) References Cited

U.S. PATENT DOCUMENTS

| | | | |
|---|---|---|---|
| 3,324,093 A | 6/1967 | Alleman et al. | |
| 3,405,109 A | 10/1968 | Rohlfing | |
| 4,543,399 A | 9/1985 | Jenkins, III et al. | |
| 4,582,816 A | 4/1986 | Miro | |
| 4,621,952 A | 11/1986 | Aronson et al. | |
| 4,960,878 A | 10/1990 | Crapo et al. | |
| 5,391,654 A | 2/1995 | Ahvenainen et al. | |
| 5,449,746 A | 9/1995 | Teshima | |
| 5,474,961 A | 12/1995 | Schlund et al. | |
| 6,429,269 B1* | 8/2002 | Leaney .................. | B01J 8/1809 526/123.1 |
| 7,750,095 B2 | 7/2010 | Martin et al. | |
| 2002/0099152 A1 | 7/2002 | Wenzel et al. | |
| 2003/0054943 A1 | 3/2003 | Kimberley | |
| 2004/0143076 A1* | 7/2004 | Terry .................... | C08F 210/16 526/82 |
| 2006/0177675 A1 | 8/2006 | Lehtinen et al. | |
| 2010/0075087 A1 | 3/2010 | Palmlof et al. | |
| 2014/0127427 A1 | 5/2014 | Vantomme et al. | |

FOREIGN PATENT DOCUMENTS

| | | |
|---|---|---|
| EP | 0188125 A2 | 7/1986 |
| EP | 0193263 A1 | 9/1986 |
| EP | 0250169 A2 | 12/1987 |
| EP | 0260130 A1 | 3/1988 |
| EP | 0423101 A2 | 4/1991 |
| EP | 0479186 A2 | 4/1992 |
| EP | 0537130 A1 | 4/1993 |
| EP | 0579426 A1 | 1/1994 |
| EP | 0630910 A1 | 12/1994 |
| EP | 0699213 A1 | 3/1996 |
| EP | 0887379 A1 | 12/1998 |
| EP | 0887380 A1 | 12/1998 |
| EP | 0887381 A1 | 12/1998 |
| EP | 0942011 A1 | 9/1999 |
| EP | 0991684 A1 | 4/2000 |
| EP | 1310295 A1 | 5/2003 |
| EP | 1415999 A1 | 5/2004 |
| EP | 1591460 A1 | 11/2005 |
| EP | 1739103 A1 | 1/2007 |
| EP | 1752462 A1 | 2/2007 |
| EP | 1969022 A1 | 9/2008 |
| EP | 0696293 B2 | 6/2009 |
| EP | 2532687 A2 | 12/2012 |
| EP | 2898950 A1 | 7/2015 |
| EP | 2966123 A1 | 1/2016 |
| JP | 2012082356 A | 4/2012 |

(Continued)

OTHER PUBLICATIONS

Baumgartel, M. et al., "Determination of the discrete relaxation and retardation time spectra from dynamic mechanical data", Rheologica Acta 1989, 28, 511-519.

Busico, V. et al., "Alk-1-ene polymerization in the presence of a monocyclipentadienyl zirconium (IV) acetamidinate catalyst: Microstructural and mechanistic insights", Macromolecular Rapid Communications 2007, 28(10), 1128-1134.

Busico, V. et al., Full assignment of the 13C NMR spectra of regioregular polypropylenes: Methyl and methylene region, Macromolecules 1997, 30, 6251-6263.

Busico, V. et al., "H NMR anlaysis of chain unsaturations in ethene/1-octene copolymers prepared with metallocene catalysts at high temperature", Macromolecules, 2005, 38(16), 6988-6996.

Busico, V. et al., "Microstructure of polypropylene", Progress in Polymer Science, 2001, 26(3), 443-533.

Castignolles, P. et al., "Detection and quantification of branching in polyacrylates by size-exclusion chromatography (SEC) and melt-state 13C NMR spectroscopy", Polymer 2009, 50(11), 2373-2383.

(Continued)

Primary Examiner — Caixia Lu
(74) Attorney, Agent, or Firm — Meunier Carlin & Curfman LLC

(57) ABSTRACT

A process for the offline deactivation of at least one single site catalyst comprising contacting said catalyst with a deactivating agent selected from an aprotic low molecular weight carbonyl group containing organic compound or an aprotic low molecular weight orthoester or an aprotic low molecular weight acetal compound.

19 Claims, No Drawings

(56) References Cited

FOREIGN PATENT DOCUMENTS

| | | |
|---|---|---|
| WO | 1992012182 | 7/1992 |
| WO | 9305079 A1 | 3/1993 |
| WO | 9426792 A1 | 11/1994 |
| WO | 1994025495 | 11/1994 |
| WO | 9512622 A1 | 5/1995 |
| WO | 9618662 A1 | 6/1996 |
| WO | 9632423 A1 | 10/1996 |
| WO | 9710248 A1 | 3/1997 |
| WO | 9728170 A1 | 8/1997 |
| WO | 9832776 A1 | 7/1998 |
| WO | 9840331 A1 | 9/1998 |
| WO | 9846616 A1 | 10/1998 |
| WO | 9849208 A1 | 11/1998 |
| WO | 9856831 A1 | 12/1998 |
| WO | 9910353 A1 | 3/1999 |
| WO | 9912981 A1 | 3/1999 |
| WO | 9919335 A1 | 4/1999 |
| WO | 9937691 A1 | 7/1999 |
| WO | 9941290 A1 | 8/1999 |
| WO | 9961489 A1 | 12/1999 |
| WO | 2000026258 | 5/2000 |
| WO | 2000029452 | 5/2000 |
| WO | 0034341 A2 | 6/2000 |
| WO | 0148034 A2 | 7/2001 |
| WO | 0170395 A2 | 9/2001 |
| WO | 0202576 A1 | 1/2002 |
| WO | 03010208 A1 | 2/2003 |
| WO | 03051514 A1 | 6/2003 |
| WO | 03051934 A2 | 6/2003 |
| WO | 2004085499 A2 | 10/2004 |
| WO | 2005105863 A2 | 11/2005 |
| WO | 2006097497 A1 | 9/2006 |
| WO | 2007025640 A1 | 3/2007 |
| WO | 2007107448 A1 | 9/2007 |
| WO | 2007116034 A1 | 10/2007 |
| WO | 2008089978 A1 | 7/2008 |
| WO | 2009027075 A2 | 3/2009 |
| WO | 2009054832 A1 | 4/2009 |
| WO | 2010027454 A1 | 3/2010 |
| WO | 2012001052 A2 | 1/2012 |
| WO | 2013007619 A1 | 1/2013 |
| WO | 2014089671 A1 | 6/2014 |
| WO | 2016083208 A1 | 6/2016 |
| WO | 2017216094 A1 | 12/2017 |
| WO | 2017216095 A1 | 12/2017 |
| WO | 2017216096 A1 | 12/2017 |

OTHER PUBLICATIONS

Dealy, J. et al., "Structure and Rheology of Molten Polymers", Hanser, 2006, 118-120.

Filip, X. et al., "Heteronuclear decoupling under fast MAS by a rotor-synchronized Hahn-echo pulse train", Journal of Magnetic Resonance 2005, 176(2), 239-243.

Griffin, JM et al., "Low-load rotor-synchronized Hahn-echo pulse train (RS-HEPT) 1H decoupling in solid-state NMR: factors affecting MAS spin-echo dephasing times", Magnetic Resonance in Chemistry, 2007, 45(S1), S198-S208.

He, Y. et al., "Unexpected proton spin-lattice relaxation in the solutions of polyolefin and tetrachloroethane", Magnetic Resonance in Chemistry, 2010, 48(7), 537-542.

Jackson, C. et al., "Molecular Weight Sensitive Detectors", Chapter 4, Handbook of Size Exclusion Chromatography and related techniques, Wu CS, 2nd ed., Marcel Dekker, New York, 2004, p. 103.

Klimke, K. et al., "Optimisation and applications of polyolefin branch quantification by melt-state 13C NMR spectroscopy", Macromolecular Chemistry and Physics 2006, 207(4), 382-395.

Parkinson, M. et al., "Effect of branch length on 13C NMR relaxation properties in molten poly[ethylene-co-(alpha-olefin)] model systems", Macromolecular Chemistry and Physics 2007, 208(19-20), 2128-2133.

International Search Report and Written Opinion dated Jul. 6, 2017 in International Application PCT/EP2017/064261.

International Search Report and Written Opinion dated Jul. 20, 2017 in International Application No. PCT/EP2017/064262.

International Search Report and Written Opinion dated Jul. 6, 2017 in International Application No. PCT/EP2017/064264.

International Search Report and Written Opinion dated Oct. 11, 2017 in International Application No. PCT/EP2017/065395.

Pollard, M. et al., "Observation of chain branching in polyethylene in the solid state and melt via 13C NMR spectroscopy and melt NMR relaxation time measurements", Macromolecules 2004, 37(3), 813-825.

Resconi, L. et al., "Selectivity in propene polymerization with metallocene catalysis", Chemical Reviews 2000, 100(4), 1253-1346.

Zhou, Z. et al., "A new decoupling method for accurate quantification of polyethylene copolymer composition and triad sequence distribution with 13C NMR", Journal of Magnetic Resonance, 2007, 187(2), 225-233.

* cited by examiner

PROCESS FOR CATALYST DEACTIVATION

CROSS-REFERENCE TO RELATED APPLICATIONS

This application is a national stage application filed under 35 U.S.C. § 371 of PCT/EP2017/065395 filed Jun. 22, 2017, which claims the benefit of priority to European Application No. 16175998.0 filed Jun. 23, 2016, both of which are hereby incorporated herein by reference in their entireties.

FIELD OF INVENTION

The present invention relates to a method for deactivation of an olefin polymerisation catalyst. More specifically, the present invention concerns a method for deactivating catalysts comprising a transition metal of Group 3 to 10 and an aluminum cocatalyst, especially single site catalysts, using a carbonyl (C=O) group containing, aprotic low molecular weight organic compound which is capable of deactivating the catalyst without non-desired side reactions.

BACKGROUND

Polyolefins such as polyethylene, polypropylene and copolymers thereof with other α-olefins are typically produced in the presence of transition metal catalysts in olefin polymerisation processes. Main classes of olefin polymerisation catalysts are single site catalysts and Ziegler-Natta catalysts.

Olefin polymerisation catalysts based on one or more transition metals are known to be active chemical compounds. Many such catalysts are pyrophoric, igniting on contact with air and/or moisture, whereby the handling of the catalyst requires extra caution and strict safety rules. For several reasons, active catalysts sometimes need to be disposed of, i.e. handled as waste material. Such reasons include poor catalyst quality, non-consumed catalyst in the polymerisation process or remaining active catalyst residues in reactors. In order to safely dispose of the active catalyst, it needs to be deactivated before any disposal steps can be carried out. However, deactivating the catalyst in a safe, and quick manner without causing any new issues to arise, is demanding. For example, side-reactions and/or foam or gas formation are a serious risk during the deactivation process.

Many catalyst deactivation techniques are known. For example, treating with water allows the active catalyst to react with the treatment medium. However, such reactions might happen violently. Although resulting in basically inert catalyst substances, this kind of reaction is inherently dangerous, especially on an industrial scale. Also, such reactions between the catalyst and deactivation medium can form non-desired gases or foam formation. Alternatively, between some deactivation media and the catalyst, the reaction may happen slowly, and might even be incomplete. This means that the catalyst can remain active and in a hazardous condition even after a long time period. There remains a need therefore to find a new process for the deactivation of catalysts.

Passivation of the catalyst during polymerisation process in order to control the process and polymer features is sometimes needed, and is as such known. U.S. Pat. No. 7,750,095 describes a treatment method for passivation the interior surface of the polymerisation reactor to minimize the formation of the polymer coating on the surface.

US 2003/0054943 discloses a method in which a metallocene catalyst may be temporarily and/or reversibly passivated by contacting it with an effective amount of a passivating compound selected from the group of oxygen, oxygen-containing compounds and nitrogen-containing compounds. Activity of such temporarily and/or reversibly passivated catalysts (latent catalyst) is no more than 50% of the catalyst before passivation. The catalyst can be re-activated by activating it with an activator, e.g. with an alkylaluminium compound.

WO99/37691 discloses a particulate deactivator selected from a metal carbonate and a hydrotalcite, which is used to passivate halogen-containing Ziegler-Natta catalyst residues from a solution polymerization process. The deactivator is added to a post-reactor, preferably in the form of a suspension, and can be used in conjunction with a secondary soluble deactivator, such as an alcohol or a carbonylic acid.

WO94/26792 discloses a method for deactivating transition metal catalysts by heating the catalyst preferably in the absence of air i.e. in an environment which is substantially unreactive (inert) with the catalyst (e.g., a vacuum or nitrogen atmosphere). The heating should be conducted at or above a temperature sufficient to decompose or render less chemically active, the active chemical compounds of the catalyst, and/or place them in a state where they do not react violently or ignite upon contact with air and/or water. The heating step should also volatilize volatile compounds, such as solvents used in catalyst manufacture. According to the teaching of this application products driven off during heating may be vented to a flare, or some other means of safely disposing of the products well known to those in the relevant art. The solids remaining after heating are substantially unreactive, or if somewhat reactive, are disclosed to react safely with elemental oxygen and water vapor in air to further move them to a substantially unreactive state. The solids may then be disposed of safely.

EP630910 describes the use of Lewis Bases (including certain protic solvents) to reversibly control the activity of a metallocene catalyst during a polymerization process. The activity can be regained by adding excess aluminoxane to scavenge the Lewis Base.

The present invention describes the passivation (killing/deactivation) of a metallocene catalyst, typically in an oil slurry, which is either a waste catalyst or un-used catalyst. Addition of passivating agent does not take place during the polymerization.

Our process is irreversible. The activity of the passivated catalyst cannot be regained. In contrast to EP630910, we cannot use protic solvents due to gas evolution, which should be avoided to prevent foaming.

There are known therefore methods for deactivation of a catalyst during a polymerisation process. Also known are methods for the treatment of polymers in order to deactivate possible catalyst residues and methods for the treatment of a surface of a polymerisation reactor with a deactivator to deactivate any residual catalyst and minimize the formation of the polymer coating on the surface. Also known are methods for temporarily and reversibly passivating a catalyst.

The present invention is however about the deactivation of much more significant catalyst concentrations as our process is offline. At the end of a polymerization process, the catalyst is removed from the reactor and the catalyst needs to be deactivated offline. Unlike the lining of the reactor or the catalyst residues in a polymer, there might be significant concentrations of catalyst to be deactivated at this point. This poses a rather different problem from simply deactivating any residual impurity in a reactor or any residual impurity in a polymer mass. This is also a different problem from deactivation within a reactor where again catalyst concentrations are low as there are other reactants, diluent, solvent etc present. In particular, there is a problem of foaming. It also possible that some un-used catalyst, due to several reasons, like quality problems, is to be deactivated.

The routine laboratory method for passivating a catalyst waste uses IPA but the inventors found that the use of this compound cannot be upscaled due to evolution of methane gas, which results in a terrible foaming on an industrial scale resulting in an incomplete deactivation and operational problems associated with foaming.

There still remains need for an improved, effective and reliable method to deactivate such active catalysts, especially single site catalysts.

It has been surprisingly observed that passivation of a single site catalyst can be effected using an aprotic organic compound comprising an C=O group, or an orthoester or acetal compound. Using these compounds gas evolution and foaming was avoided (compared to using an alcohol) and the passivation reaction was fast and effective resulting in passivated waste material, the further handling of which can be carried out safely.

The present inventors have now found that certain organic compounds can be added to catalysts to passivate them without foaming or methane or other gas formation. Furthermore, the process of the invention occurs over a short period of time in a safe way. Short deactivation time is essential in semi- and full-scale production plants, where a need to deactivate even big amounts of catalysts might arise.

SUMMARY OF INVENTION

Thus viewed from one aspect the invention provides a process for the offline deactivation of at least one single site catalyst comprising contacting said catalyst with a deactivating agent selected from an aprotic low molecular weight carbonyl group containing organic compound or an aprotic low molecular weight orthoester or aprotic low molecular weight acetal compound.

Viewed from another aspect the invention provides a process for offline deactivation of at least one solid single site catalyst comprising contacting said solid catalyst with a deactivating agent selected from an aprotic low molecular weight carbonyl group containing organic compound or an aprotic low molecular weight orthoester or an aprotic low molecular weight acetal compound, e.g. for a period of at least 24 hours.

Viewed from another aspect the invention provides a process for offline deactivation of at least one solid single site catalyst, said catalyst being in the form of a slurry in oil, comprising contacting said catalyst with a deactivating agent selected from an aprotic low molecular weight carbonyl group containing organic compound or an aprotic low molecular weight orthoester or an aprotic low molecular weight acetal compound.

Viewed from another aspect the invention provides a process for deactivation of a solid single site catalyst comprising (i) a metallocene complex of formula (I)

wherein M is a transition metal (M) transition metal (M) of Group 3 to 10 of the Periodic Table (IUPAC 2007), each X is independently a monoanionic ligand, such as a σ-ligand, each L is independently an organic ligand which coordinates to the transition metal M, R is a bridging group linking said organic ligands (L),
m is 1, 2 or 3, preferably 2
n is 0, 1 or 2, preferably 1,
q is 1, 2 or 3, preferably 2 and
m+q is equal to the valency of the transition metal (M); and (ii) an Al containing cocatalyst such as an aluminoxane of of formula (X)

[—O—Al (Alk)-O—Al(Alk)-O], (X)

where Alk is an alkyl group of 1 to 6 carbon atoms and is bound to aluminum;

comprising contacting said catalyst with a deactivating agent selected from an aprotic low molecular weight carbonyl group containing organic compound or an aprotic low molecular weight orthoester or an aprotic low molecular weight acetal compound.

Viewed from another aspect the invention provides use of a deactivating agent selected from an aprotic low molecular weight carbonyl group containing organic compound or an aprotic low molecular weight orthoester or an aprotic low molecular weight acetal compound for the deactivation of a solid single site catalyst.

Viewed from another aspect the invention provides a deactivation mixture comprising (A) a solid catalyst comprising (i) a metallocene complex of formula (I)

wherein M is a transition metal (M) transition metal (M) of Group 3 to 10 of the Periodic Table (IUPAC 2007), each X is independently a monoanionic ligand, such as a σ-ligand,
each L is independently an organic ligand which coordinates to the transition metal M,
R is a bridging group linking said organic ligands (L),
m is 1, 2 or 3, preferably 2
n is 0, 1 or 2, preferably 1,
q is 1, 2 or 3, preferably 2 and
m+q is equal to the valency of the transition metal (M); and (ii) an Al containing cocatalyst;

and (B) an aprotic low molecular weight carbonyl group containing organic compound or an aprotic low molecular weight orthoester or an aprotic low molecular weight acetal compound. It will be appreciated that this mixture is substantially free from any olefins. The catalyst may be a homogeneous catalyst or a heterogeneous supported catalyst or a catalyst in solid form but being free of any external carrier.

Definitions

The term offline is used to define the fact that the deactivation procedure is effected at a time when the catalyst is not acting as a polymerisation catalyst. The polymerisation reaction which the catalyst may have been catalysing must be stopped before the deactivation procedure is carried out. The term offline is also used to define the fact that the deactivation procedure is effected at a time when the catalyst is not acting as a catalyst in general, e.g. as a hydrogenation catalyst. The reaction which the catalyst may have been catalysing must be stopped before the deactivation procedure is carried out. Offline deactivation in the present application covers also deactivation of catalyst, which has not been fed into the polymerisation reactor, but is to be handled as waste material. The deactivating agent of the invention comprises a carbonyl group or an acetal or orthester derivative thereof. The term orthoester refers to compounds in which three alkoxy groups attach to one carbon atom. An acetal is a carbonyl derivative in which two alkoxy groups attach to one carbon atom. Such structures are given in formulae below.

The process of the invention may be effected on at least one single site catalyst, such as one single site catalyst or a dual site catalyst formed from the combination of two single site catalysts. The invention may therefore be carried out on multisite catalysts formed from the combination of a plurality of single site catalysts.

DETAILED DESCRIPTION OF INVENTION

This invention relates to a process for the deactivation or passivation of a catalyst suitable for the polymerisation of olefins. The terms deactivation or passivation are used interchangeably herein. In the invention, a catalyst is deemed passivated or deactivated when it no longer reacts with water. It is envisaged that even using the process of the invention in which ideal catalyst deactivators are suggested, the deactivation procedure may take at least 24 hours, such as at least 48 hours, even at least 72 hrs. Typically, the deactivation process will take less than 14 days, preferably less than 12 days, especially less than 10 days.

The deactivation process is not therefore instantaneous and deactivation does not occur immediately on contact with the deactivating agents taught herein. Rather, prolonged exposure is required to ensure complete deactivation.

As disclosed above, it was known that protic compounds such as alcohols, and organic acids are catalyst killers. However, we have found that these protic compounds, in particular, isopropanol are not suitable for the deactivation of polyolefin catalysts as during the deactivation process, methane gas evolves and the deactivation solution foams. Further, deactivation with protic compounds is slow and ineffective as after many weeks, some catalyst is still not totally deactivated. This is shown as the catalyst still reacts with water. It is envisgaed that the reactive proton reacts with alkyl group of aluminium releasing methane gas —R—O—H+Al—CH$_3$→H—CH$_3$+R—O—Al.

The inventors have therefore found that single-site catalysts containing an Al based cocatalyst such as MAO can be deactivated with a readily available compound such as acetone, which will react with the Al in MAO, but will not result in the formation of CH$_4$ gas. It is believed that the avoidance of protic compounds such as alcohols is important to prevent gas evolution.

The use of the deactivating agent of the invention leads to chemical deactivation in a way that an active Me group from Al is trapped by, for example, the C=O linkage of acetone, preventing the formation of any gas, and hence avoiding the major problem of foam formation at larger scale.

Moreover, the kinetics of passivation is much faster with the deactivating agents of the invention than with alcohols.

The invention requires treatment of the active catalyst with deactivating agent which is an aprotic low molecular weight carbonyl group containing organic compound or with an aprotic acetal or orthoester derivative of a carbonyl group containing compound. The deactivating agent is preferably a liquid at the conditions of contact with the catalyst, e.g. liquid at room temperature. Alternatively, the deactivating agent may be formulated as a liquid through combination with an inert solvent as discussed below. Either way, it is preferred if the deactivating agent is delivered in a liquid form.

The aprotic carbonyl, orthoester or acetal compound used is one which has a low molecular weight. By low Mw is meant that the molecular weight of the carbonyl group containing organic molecule, orthoester or acetal is preferably less than 750 g/mol, such as less than 500 g/mol, especially less than 400 g/mol.

The carbonyl group containing organic molecule, orthoester or acetal compound typically will have a molecular weight of at least 50 g/mol. A preferred range is therefore 50 to 300 g/mol.

The carbonyl group containing organic molecule, orthoester or acetal compound preferably consists of atoms of H, C and O only.

The carbonyl group containing compound, orthoester or acetal is aprotic. A protic compound is one containing a hydrogen atom bound to an oxygen (as in a hydroxyl group) or a nitrogen (as in an amine group) which is labile. The molecules of such protic compounds readily donate protons (H+). The carbonyl group containing compound, orthoester or acetal of the invention is aprotic and cannot donate hydrogen.

The carbonyl group containing compound, orthoester or acetal is thus free of —OH residues so the carbonyl group containing compound should not contain be a carboxylic acid —COOH. In general, the groups —OH and —COOH should be avoided as "protic" compounds will release methane gas in the deactivation process as illustrated above.

The carbonyl group containing compound is preferably an ester, ketone, anhydride or aldehyde. More especially the carbonyl group containing organic molecule is a ketone or aldehyde, especially a ketone.

The deactivating compound is preferably a compound of formula III or IV

$$R^{10}—CO—R^{11} \quad (III),$$

where $R^{10}$ is a hydrocarbyl group of 1 to 12 C atoms, such as a C1-12 alkyl group;

$R^{11}$ is H, a hydrocarbyl group of 1 to 12 C atoms, or a OR$^{12}$ group, or $R^{10}$ and $R^{11}$ can form with the C atom they are attached to a ring of 3 to 8 ring atoms optionally containing an O atom, and $R^{12}$ is a hydrocarbyl group of 1 to 12 C atoms.

The compound may also be one of formula (IV)

$$R^{10}(H)_{3-n}C(OR^{12})_n \quad (IV)$$

where $R^{10}$ is a hydrocarbyl group of 1 to 12 C atoms;

$R^{11}$ is H, a hydrocarbyl group of 1 to 12 C atoms, or a OR$^{12}$ group, or $R^{10}$ and $R^{11}$ can form with the C atom they are attached to a ring of 3 to 8 ring atoms optionally containing an O atom, and $R^{12}$ is a hydrocarbyl group of 1 to 12 C atoms, and n is 2 or 3.

Any hydrocarbyl group as defined for $R^{10}$-$R^{12}$ is preferably a $C_{1-10}$ alkyl group, such as a $C_{1-6}$ alkyl group, especially a $C_{1-4}$ alkyl group most especially methyl or ethyl.

Specific ketones of interest are those of formula (V)

$$R^1COR^2 \quad (V)$$

wherein $R^1$ and $R^2$ are each independently a C1-6 alkyl group, such as a C1-4 alkyl group, especially methyl or ethyl; or $R^1$ and $R^2$ taken together form a 5-8 membered ring with the C atom they are attached to.

Highly preferred options for the carbonyl group containing organic molecule are acetone or methyl ethyl ketone, especially acetone. It is of course possible to use a mixture of deactivating agents.

Preferred orthoesters include trimethylorthoformate. Preferred acetals include dimethoxymethane.

The deactivating agent is a preferably liquid to ensure good contact between the catalyst and the deactivating agent. The deactivating agent is preferably a liquid at 25° C. It is also preferred if the deactivating agent is used dry, i.e. there is no water present as a solvent or the like in the deactivating agent. There should be less than 0.1% water in the deactivating agent as water reacts with the catalyst violently, such as less than 0.01 wt % (ideally no water at all).

It is possible that the deactivating agent is combined with a solvent in order to provide the deactivating agent in liquid form. That solvent should not react with the catalyst. The deactivating agent may also be provided in an oil, such as the oils used to carry the catalyst for deactivation.

Ideally, the deactivation process can be effected without any special precautions in terms of reaction atmosphere. The deactivation process is preferably effected in air although an inert atmosphere such as nitrogen could also be employed.

In the context of MAO and without wishing to be limited by theory, the use of the carbonyl compounds, such as acetone as the passivating agent, leads to chemical deactivation in a way that an active Me group from Al is trapped by the C=O linkage, preventing the formation of any gas, and hence avoiding the major problem of foam formation at larger scale.

The amount of deactivating agent required is obviously dependent on the amount of catalyst that needs deactivation. Generally, the deactivating agent is cheap and it is therefore possible to use an excess of the deactivating agent relative to the amount of catalyst. For example, there may be a minimum of 2 mols of deactivating agent per mol of Al ions in the Al catalyst. Preferably, there might be 3 mols deactivating agent per mol of Al ions in the catalyst, such as 4 mols or more. Thus the molar ratio of deactivating agent to Al ions in the catalyst may be at least 3:1, preferably at least 4:1.

In some embodiments, a large excess of deactivating agent can be used, such as 10 mols or more deactivating agent to Al ions. It is thus preferable to use an excess of the deactivating agent to enable total deactivation of the catalyst.

As noted below, the deactivating agent can be added over time so these numbers represent the total amount of deactivating added over the deactivation procedure and not just the amount added initially.

In order to initiate the deactivation procedure, it is appropriate to add at least 2 mol deactivating agent to Al present in the cocatalyst, such as 2 to 3 mols per mol of Al initially, e.g. over a period of 1 hr of less.

The deactivating agent of the invention ideally reacts with the active catalyst material without generating methane. Ideally, the deactivating agent reacts with the active catalyst material without generating any gas. If gas evolves, that leads to foaming in the deactivation vessel and that is undesirable. Also, the compound has to be one that reacts fast enough that the whole catalyst is deactivated in a short time and safely.

During the deactivation procedure, the catalyst remains in contact with the deactivating agent throughout. It is preferred if the deactivation process does not generate significant heat, e.g. the reaction mixture increases in temperature of less than 5° C., such as less than 3° C.

The deactivation procedure takes place offline. As the catalyst is being deactivated, the polymerisation process which it may previously have catalyzed has been stopped.

The deactivation process may occur within the reactor in which the catalyst was used. However, preferably the catalyst is transferred from the reactor to a dedicated deactivation vessel. In some embodiments, the catalyst may not have been used in a polymerization reaction in which case deactivation is likely to take place in a deactivation vessel. Any conventional vessel may be used. In the most preferred embodiment, deactivation occurs in a vessel separate from any reactor used to carry out an olefin polymerisation reaction.

It will be appreciated that the deactivation vessel or the reactor may contain residual components from the polymerisation reaction such as diluent, unreacted comonomer and so on. It is preferred if the catalyst is separated from these components before deactivation to remove as many of the volatile organic contaminants. The process can however be effected in the presence of low amounts of diluent, comonomers etc so excessive purification techniques are not essential.

It is also preferred if the deactivation process is effected substantially in the absence of any polymer made by the catalyst. Methods for the treatment of polymers in order to deactivate possible catalyst residues are known but the process of this case is one which is effected substantially in the absence of any polymer. It will be appreciated that polymer may form a minor impurity in any catalyst being deactivated but levels of polymer should be very low, such as less than 0.1 wt %.

The deactivation process can be effected at any convenient temperature, typically between 0 and 40° C. Ideally, deactivation can take place under ambient temperature, e.g. 20 to 25° C.

The pressure within the deactivation procedure is typically atmospheric, although small overpressure could also be used, such as 1.1-10 barg. An overpressure would suppress any possible foaming of the reaction mixture.

It is particularly preferred if the deactivation procedure is used on a catalyst in the form of an oil slurry. It is especially preferred if the oil has a viscosity of from 20 to 1500 mPa·s. As is known in the art single-site catalysts tend to be very pyrophoric, whereby the single-site catalyst as dry powder may cause problems especially due to the safety reasons. Keeping the catalyst in oil solves this issue.

The oil catalyst slurry could be formed within the reactor and then removed for deactivation or formed after the catalyst has been removed from the reactor. In some embodiments, the catalyst is supplied to a polymerization reaction as part of an oil slurry. In that scenario, the oil may already be present within the reactor and the oil slurry to be treated can simply be removed from the reactor and separated from the other polymerisation reaction components. The reactor is to be understood to comprise the whole reactor configuration including piping, where catalyst is present.

The oil used is any conventional inert mineral oil such as white oil. The mineral oil is ideally a colorless, mixture of higher alkanes from a mineral source, particularly a distillate of petroleum.

The amount of oil required may be sufficient to make a 5 to 30 wt % slurry of catalyst within the oil, such as 5 to 20 wt %. The term slurry is used herein to mean that the catalyst does not dissolve in the oil but rather forms a slurry in which the solid catalyst particles are dispersed.

The deactivating agent can be added continuously or batchwise. Ideally, the deactivating agent is added over time, i.e. the total amount needed for deactivation is not added at once at the start of the deactivation procedure but is added continuously overtime or added in batches.

In order to check the progress of the deactivation procedure it is possible to withdraw aliquots of the reaction mixture and test the aliquot with water. If water reacts with the reaction mixture, e.g. to cause foaming or liberation of gas, then the deactivation procedure is not finished. A deactivated catalyst will not react with water.

After deactivation has taken place, the deactivation agent can be removed to leave a deactivated catalyst. The deactivated catalyst is typically a solid and hence the deactivation agent is readily removed, e.g. by filtration or distillation.

Scheme 1 summarises the current technology and the preferred process of the invention.

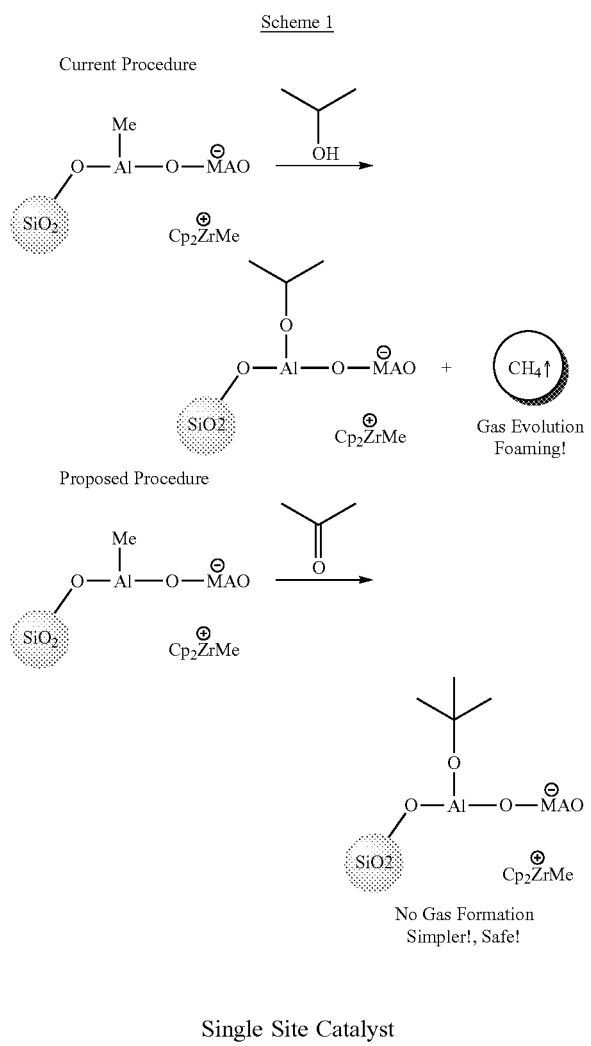

Single Site Catalyst

The deactivation process of the invention can generally be applied to any single site olefin polymerization catalyst that needs deactivation, in particular one in which the cocatalyst present comprises Al. The process is unsuitable for the deactivation of Ziegler Natta catalysts or Philips catalysts. The process can be used to deactivate dual site catalysts, e.g. those made by supporting two different single site catalysts on the same support or made by intimately mixing two single site catalysts.

The catalyst of the invention preferably comprises a metal complex as defined further below and an Al cocatalyst.

The process of the invention can be effected on any single site catalyst, such as a metallocene catalyst. Preferred single site catalysts are those based on organometallic compounds (C) comprising a transition metal (M) of Group 3 to 10 of the Periodic Table (IUPAC 2007). Well known constrained geometry catalysts or bis cyclopentadienyl type catalysts can be deactivated.

The term "an organometallic compound (C)" (or the term metal complex) in accordance with the present invention includes any metallocene or non-metallocene compound of a transition metal which bears at least one organic (coordination) ligand and exhibits catalytic activity alone or together with a cocatalyst. The transition metal compounds deactivated in the process of the invention are well known in the art and the present invention covers compounds of metals from Group 3 to 10, e.g. Group 3 to 7, or 3 to 6, such as Group 4 to 6 of the Periodic Table, (IUPAC 2007).

Organometallic compound (C) has typically the following formula (I):

wherein M is a transition metal of Group 3 to 10 of the Periodic Table (IUPAC 2007), each X is independently a monoanionic ligand, such as a σ-ligand, each L is independently an organic ligand which coordinates to the transition metal M, R is a bridging group linking said organic ligands (L), m is 1, 2 or 3, preferably 2 n is 0, 1 or 2, preferably 1, q is 1, 2 or 3, preferably 2 and m+q is equal to the valency of the transition metal (M).

M is preferably selected from the group consisting of zirconium (Zr), hafnium (Hf), or titanium (Ti), more preferably selected from the group consisting of zirconium (Zr) and hafnium (Hf).

In a more preferred definition, each organic ligand (L) is independently (a) a substituted or unsubstituted cyclopentadienyl or a bi- or multicyclic derivative of a cyclopentadienyl which optionally bears further substituents and/or one or more heteroring atoms from a Group 13 to 16 of the Periodic Table (IUPAC); or (b) an acyclic $\eta^1$- to $\eta^4$- or $\eta^6$-ligand composed of atoms from Groups 13 to 16 of the Periodic Table, and in which the open chain ligand may be fused with one or two, preferably two, aromatic or non-aromatic rings and/or bear further substituents; or (c) a cyclic $\eta^1$- to $\eta^4$- or $\eta^6$-, mono-, bi- or multidentate ligand composed of unsubstituted or substituted mono-, bi- or multicyclic ring systems selected from aromatic or non-aromatic or partially saturated ring systems, such ring systems containing optionally one or more heteroatoms selected from Groups 15 and 16 of the Periodic Table.

Organometallic compounds (C), preferably used in the present invention, have at least one organic ligand (L) belonging to the group (a) above, preferably two such ligands. Such organometallic compounds are called metallocenes. The organometallic compound can therefore be a well-known "bis" metallocene catalyst or a constrained geometry catalyst.

More preferably at least one of the organic ligands (L), preferably both organic ligands (L), is (are) selected from the group consisting of cyclopentadienyl, indenyl, tetrahydroindenyl or fluorenyl, which can be independently substituted or unsubstituted, more preferably Cp or indenyl.

Further, in case the organic ligands (L) are substituted it is preferred that at least one organic ligand (L), preferably both organic ligands (L), comprise one or more substituents independently selected from $C_1$ to $C_{20}$ hydrocarbyl or silyl groups, which optionally contain one or more heteroatoms selected from groups 14 to 16 and/or are optionally substituted by halogen atom(s). A $C_1$ to $C_{20}$ hydrocarbyl group, which contains one or more heteroatoms selected from groups 14 to 16 includes, for example, an alkoxy group. Thus, the heteroatom may start or end the group.

The term $C_1$ to $C_{20}$ hydrocarbyl group, whenever used in the present application, includes $C_1$ to $C_{20}$ alkyl, $C_2$ to $C_{20}$ alkenyl, $C_2$ to $C_{20}$ alkynyl, $C_3$ to $C_{20}$ cycloalkyl, $C_3$ to $C_{20}$ cycloalkenyl, $C_6$ to $C_{20}$ aryl, $C_7$ to $C_{20}$ alkylaryl or $C_7$ to $C_{20}$ arylalkyl groups or mixtures of these groups such as cycloalkyl substituted by alkyl.

Further, two substituents, which can be same or different, attached to adjacent C-atoms of a ring of the ligands (L) can also taken together form a further mono or multicyclic ring fused to the ring.

Preferred substituent groups include linear or branched $C_1$ to $C_{10}$ alkyl groups, substituted or unsubstituted $C_6$ to $C_{20}$ aryl groups, $C_{5-6}$ cycloalkyl, —SCl-10alkyl or —OCl-10 alkyl groups.

More preferred substituent groups are linear or branched $C_1$ to $C_{10}$ alkyl groups, more preferably selected from methyl, ethyl, propyl, isopropyl, tertbutyl, or isobutyl, $C_{5-6}$ cycloalkyl, —OR, —SR, where R is $C_1$ to $C_{10}$ alkyl group.

$C_6$ to $C_{20}$ aryl groups are more preferably phenyl groups, optionally substituted with 1 or 2 $C_1$ to $C_{10}$ alkyl groups as defined above.

If a substituent group is present, there may be 1 to 7 substituents, such as 1 to 5 substituents. On a Cp ring there might be 1 or 2 substituents. On a indenyl ring, there might be 1 to 4 substituents, such as on the 2, 4, 5, and 6 positions of the indenyl ring.

By "σ-ligand" is meant throughout the invention a group bonded to the transition metal (M) via a sigma bond.

Further, the ligands "X" are preferably independently selected from the group consisting of hydrogen, halogen, $C_1$ to $C_{20}$ alkyl, $C_1$ to $C_{20}$ alkoxy, $C_2$ to $C_{20}$ alkenyl, $C_2$ to $C_{20}$ alkynyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, —SR", —PR"$_3$, —SiR"$_3$, —OSiR"$_3$ and —NR"$_2$, wherein each R" is independently hydrogen, $C_1$ to $C_{20}$ alkyl, $C_2$ to $C_{20}$ alkenyl, $C_2$ to $C_{20}$ alkynyl, $C_3$ to $C_{12}$ cycloalkyl or $C_6$ to $C_{20}$ aryl.

More preferably "X" ligands are selected from halogen, $C_1$ to $C_6$ alkyl, $C_5$ to $C_6$ cycloalkyl, $C_1$ to $C_6$ alkoxy, phenyl and benzyl groups.

The bridging group R may be a divalent bridge, preferably selected from —R'$_2$C—, —R'$_2$C—CR'$_2$—, —R'$_2$Si—, —R'$_2$Si—Si R'$_2$—, —R'$_2$Ge—, wherein each R' is independently a hydrogen atom, $C_1$ to $C_{20}$ alkyl, $C_2$ to $C_{10}$ cycloalkyl, tri($C_1$-$C_{20}$-alkyl)silyl, $C_6$-$C_{20}$-aryl, $C_7$-$C_{20}$ arylalkyl and $C_7$-$C_{20}$-alkylaryl.

More preferably the bridging group R is a divalent bridge selected from —R'$_2$C—, —R'$_2$Si—, wherein each R' is independently a hydrogen atom, $C_1$ to $C_{20}$ alkyl, $C_2$ to $C_{10}$ cycloalkyl, $C_6$-$C_{20}$-aryl, $C_7$-$C_{20}$ arylalkyl and $C_7$-$C_{20}$-alkylaryl. Preferred bridging groups are dimethylsilyl, methylene or ethylene.

Another subgroup of the organometallic compounds (C) of formula (I) is known as non-metallocenes wherein the transition metal (M), preferably a Group 4 to 6 transition metal, suitably Ti, Zr or Hf, has a coordination ligand other than a cyclopentadienyl ligand.

The term "non-metallocene" used herein means compounds, which bear no cyclopentadienyl ligands or fused derivatives thereof, but one or more non-cyclopentadienyl η, or σ-, mono-, bi- or multidentate ligand. Such ligands can be chosen e.g. from the groups (b) and (c) as defined above and described e.g. in WO 01/70395, WO 97/10248, WO 99/41290, and WO 99/10353).

However, the organometallic compound (C) of the present invention is preferably a metallocene as defined above.

Metallocenes are described in numerous patents. In the following just a few examples are listed; EP 260 130, WO 97/28170, WO 98/46616, WO 98/49208, WO 98/040331, WO 99/12981, WO 99/19335, WO 98/56831, WO 00/34341, WO00/148034, EP 423 101, EP 537 130, WO2002/02576, WO2005/105863, WO 2006097497, WO2007/116034, WO2007/107448, WO2009/027075, WO2009/054832, WO 2012/001052, and EP 2532687, the disclosures of which are incorporated herein by reference. Further, metallocenes are described widely in academic and scientific articles.

A more preferred complex of the invention is therefore of formula (II)

$$(L)_2R_nMX_2 \qquad (II)$$

wherein M is Ti, Zr or Hf;

X is a sigma ligand such as halogen, $C_1$ to $C_6$ alkyl, $C_5$ to $C_6$ cycloalkyl, $C_1$ to $C_6$ alkoxy, phenyl and benzyl group;

L is a cyclopentadienyl, indenyl or tetrahydroindenyl ligand optionally substituted by one or more, such as 1 to 7, groups of formula $R^5$;

R is a bridge between the two L ligands of formula R'$_2$C—, or —R'$_2$Si—, wherein each R' is independently a hydrogen atom, $C_1$ to $C_{20}$ alkyl, $C_2$ to $C_{10}$ cycloalkyl, $C_6$-$C_{20}$-aryl, $C_7$-$C_{20}$ arylalkyl and $C_7$-$C_{20}$-alkylaryl;

n is 0 or 1;

and each $R^5$ a linear or branched $C_1$ to $C_{10}$ alkyl groups, more preferably selected from methyl, ethyl, propyl, isopropyl, tertbutyl, or isobutyl, $C_{5-6}$ cycloalkyl, —OR, —SR, where R is $C_1$ to $C_{10}$ alkyl group; or two $R^5$ groups bound to adjacent carbon atoms can be taken together to form a ring which ring can itself be substituted by one or more groups $R^5$.

It will be appreciated that single-site catalysts are used together with an activator, also called a cocatalyst. It is preferred if the catalyst deactivated according to the invention comprises an Al containing cocatalyst. Suitable activators are metal alkyl compounds, especially aluminium alkyl compounds. Al cocatalysts can be combined with B cocatalysts as is well known in the art.

Especially suitable activators used with single-site catalysts are alkylaluminium oxy-compounds, such as methylalumoxane (MAO), tetraisobutylalumoxane (TIBAO) or hexaisobutylalumoxane (HIBAO).

The catalyst to be deactivated will preferably comprise a complex as herein defined combined with a Al containing cocatalyst.

Single-site catalysts may be used as homogenous catalysts or heterogeneous catalysts. Nowadays heterogeneous catalysts are preferably used which remain solid within the reaction medium of the polymerisation. Heterogeneous catalysts are therefore solid and may be supported on an external support material. It is preferred if the process of the invention is carried out on a solid catalyst, e.g. a solid particulate.

The external support used with single site catalysts is preferably silica, alumina or aluminoxane. In a preferred embodiment, the single site catalyst of the invention is carried on an external support material such as silica.

Another type of solid (and hence heterogeneous catalyst) catalyst is prepared by emulsion-solidification method, where no external carrier material is used in the catalyst preparation, as described e.g. in WO2003/051934. This catalyst is one that is solid, preferably particulate, but free of an external carrier. In one embodiment of the invention the process is carried out on a catalyst comprising a metallocene complex and an Al cocatalyst, said catalyst being in solid form but free of an external carrier.

Such a catalyst is obtainable by a process in which
(a) a liquid/liquid emulsion system is formed, said liquid/liquid emulsion system comprising a solution of the catalyst complex (A) and cocatalyst (B) dispersed in a solvent so as to form dispersed droplets; and
(b) solid particles are formed by solidifying said dispersed droplets.

Thus the process comprises obtaining a metallocene complex and a cocatalyst as hereinbefore described;
forming a liquid/liquid emulsion system, which comprises a solution of the catalyst components dispersed in a solvent, and solidifying said dispersed droplets to form solid particles. Full details of these process can be found in WO2003/051934 above.

The invention is now described with reference to the following non limiting examples.

EXAMPLES

The catalyst used in the following experiments is Albemarle ActivCat® carrier with metallocene complex bis(1-methyl-3-n-butylcyclopentadienyl)Zr(IV)Cl$_2$.

Comparative Example 1

The catalyst was mixed with oil (3.0 g; 10 wt % in oil slurry with Primol 352, (CAS no 8042-47-5,) prior to deactivation. The oil/catalyst slurry was contacted with isopropyl alcohol (IPA) (2.0 g) at ambient temperature and pressure in a vessel. The reaction mixture immediately foamed and the volume of the reaction mixture increased 3-4 times in a few minutes.

Inventive Example 1

Comparative exmple 1 was repeated but with 2.0 g of acetone instead of IPA. Treatment with acetone resulted in minimal foaming. The inventors consider that any foaming is likely due to impurity, e.g. from the residual presence of moisture, IPA or phenol in the catalyst or in the technical grade acetone. The reaction volume did not increase significantly as was the case with IPA.

The residual activity after treatment with acetone was monitored after every 30 minutes by withdrawing a small portion of the reaction mixture and testing it by contacting with water (2.0 mL). No violent reaction was observed after 2 h on contact with water.

Comparative Example 2

The experiments above were conducted on an industrial scale. 0.8 kg of dry catalyst was transferred under inert conditions into 20 L vessel, and vacuum dried oil (7.2 kg) was added to prepare a 10% catalyst oil slurry. Reactor jacket temperature was set to 20° C.

On addition of IPA, heavy foaming was observed. Fill level which was originally less than half of the vessel increased to close to the lid. Addition rate of IPA had to be slowed to prevent overflow. Foam level in the vessel could be controlled by pressure—higher pressure, lower fill level. It is perceived that foaming was caused by methane generated by the reaction of IPA and MAO.

After 5 hours, 700 ml IPA (IPA/Al=1.8 mol/mol) had been added. The temperature in the reactor increased by ~1° C. during IPA addition.

The progress of the passivation reaction was followed by withdrawing 40 ml of oil slurry sample into a 100 ml Schott bottle and treating with 10 ml of tap water. In case of vigorous foaming and temperature rise, oil slurry was defined to be still active.

The first sample was taken via the vessel bottom valve after 24 h. The mixture was foaming during sampling. An exothermic reaction with foaming was observed on contact with water.

Further addition of IPA over the next hours led to even more severe foaming, which was hard to control.

After 33 days of contact with IPA, the mol/mol ratio IPA/Al in catalyst was >5, and still the catalyst oil slurry was not fully deactivated. The total amount IPA added during the deactivation was 1900 ml.

Inventive Example 2

A 10 wt % catalyst oil slurry was prepared as in comparative example 2. Reactor jacket temp was set to 20° C. Addition of acetone was started as 50 ml portions. It was immediately observed that there was less foaming and therefore 800 ml acetone could be added within 70 min into reactor (acetone/Al=2.2 mol/mol).

Temperature in the reactor was increased ~1° C. during acetone addition. Catalyst/oil/acetone mixture was mixed over the weekend before the first sampling after 3 days.

Activity test (40 ml sample+10 ml water) was stable compared to the comparative example 2. Passivation of the mixture in the reactor was continued and 630 ml acetone was added into the reactor. The total amount of acetone added was thus 1430 ml. The final acetone/Al mol/mol ratio was ~4. Deactivation was deemed complete.

In order to remove the deactivation agent, reactor oil circulation temperature was increased to 80° C. and nitrogen was fed 0.5 kg/h via the vessel bottom valve. Heating was continued overnight. An activity check with water was carried out after removal of the acetone and no exotherm or gas formation was observed. In case of acetone, passivation of catalyst took 8 days.

The invention claimed is:

1. A process for the offline deactivation of at least one single site catalyst, the process comprising contacting said at least one single site catalyst with a deactivating agent selected from: an aprotic low molecular weight carbonyl group containing an organic compound, an aprotic low molecular weight orthoester, or an aprotic low molecular weight acetal compound.

2. The process as claimed in claim 1, wherein said at least one single site catalyst is solid.

3. The process as claimed in claim 1, wherein the at least one single site catalyst is a metallocene or non-metallocene compound of a transition metal which bears at least one organic (coordination) ligand and exhibits catalytic activity together with an Al containing cocatalyst.

4. The process as claimed in claim 1, wherein the at least one single site catalyst comprises:
(i) a metallocene complex of formula (I)

$$(L)_m R_n MX_q \qquad (I)$$

wherein

M is a transition metal of Group 3 to 10 of the Periodic Table (IUPAC 2007), each X is independently a monoanionic ligand, each L is independently an organic ligand which coordinates to the transition metal M, R is a bridging group linking said organic ligands (L), m is 1, 2, or 3, n is 0, 1, or 2, q is 1, 2, or 3, and m+q is equal to the valency of the transition metal (M); and (ii) an Al containing cocatalyst.

5. The process as claimed in claim 1, wherein said deactivating agent has an Mw of less than 750 g/mol.

6. The process as claimed in claim 1, wherein the deactivation agent is a compound of formula (III) or a compound of formula (IV)

$$R^{10}-CO-R^{11} \quad (III)$$

$$R^{10}(H)_{3-n}C(OR^{12})_n \quad (IV)$$

where $R^{10}$ is a hydrocarbyl group of 1 to 12 C atoms;

$R^{11}$ is H, a hydrocarbyl group of 1 to 12 C atoms, or a $OR^{12}$ group, or $R^{10}$ and $R^{11}$ together with the C atom they are attached to form a ring of 3 to 8 ring atoms optionally containing an O atom, $R^{12}$ is a hydrocarbyl group of 1 to 12 C atoms, and n is 2 or 3.

7. The process as claimed in claim 1, wherein the deactivation agent is a ketone.

8. The process as claimed in claim 1, wherein the at least one single site catalyst is supported on an external carrier or wherein the at least one single site catalyst is in solid form but is free from an external carrier.

9. The process as claimed in claim 1, wherein the deactivating agent is in liquid form.

10. The process as claimed in claim 1, wherein the at least one single site catalyst is in the form of a slurry in oil before the deactivation process begins.

11. The process as claimed in claim 1, wherein the process comprises adding the deactivation agent continuously.

12. The process as claimed in claim 1, wherein the deactivation process takes 1 to 10 days.

13. The process as claimed in claim 1, wherein the process is performed at ambient temperature in air.

14. The process as claimed in claim 1, wherein the at least one single site catalyst comprises Al ions and the molar ratio of deactivating agent to Al ions in the at least one single site catalyst is at least 3:1.

15. The process as claimed in claim 1, wherein the deactivating agent is acetone, the at least one single site catalyst is supported on an external carrier, and the at least one single site catalyst comprises an Al containing cocatalyst.

16. The process as claimed in claim 1, wherein the at least one single site catalyst comprises a complex of formula (II)

$$(L)_2R_nMX_2 \quad (II)$$

wherein

M is Ti, Zr or Hf;

X is a sigma ligand;

L is a cyclopentadienyl, indenyl, or tetrahydroindenyl ligand optionally substituted by one or more groups of formula $R^5$;

R is a bridge between the two L ligands and R is of formula $R'_2C-$, or $R'_2Si-$, wherein each R' is independently a hydrogen atom, $C_1$ to $C_{20}$ alkyl, $C_3$ to $C_{10}$ cycloalkyl, $C_6$-$C_{20}$ aryl, $C_7$-$C_{20}$ arylalkyl, or $C_7$-$C_{20}$-alkylaryl;

n is 0 or 1; and each $R^5$ is a linear or branched $C_1$ to $C_{10}$ alkyl group, or two $R^5$ groups bound to adjacent carbon atoms taken together form a ring, wherein the ring itself is optionally substituted by one or more $R^5$ groups.

17. A method of use of an aprotic low molecular weight carbonyl group containing organic compound, an aprotic low molecular weight orthoester, or an aprotic low molecular weight acetal compound, the method comprising using the aprotic low molecular weight carbonyl group containing organic compound, the aprotic low molecular weight orthoester, or the aprotic low molecular weight acetal compound for the deactivation of a solid single site catalyst.

18. A deactivation mixture comprising:

(A) (i) a solid catalyst comprising metallocene complex of formula (I)

$$(L)_mR_nMX_q \quad (I)$$

wherein

M is a transition metal of Group 3 to 10 of the Periodic Table (IUPAC 2007), each X is independently a monoanionic ligand, each L is independently an organic ligand which coordinates to the transition metal M, R is a bridging group linking said organic ligands (L), m is 1, 2, or 3, n is 0, 1, or 2, q is 1, 2, or 3, and m+q is equal to the valency of the transition metal (M); and (ii) an Al containing cocatalyst; and (B) an aprotic low molecular weight carbonyl group containing organic compound, an aprotic low molecular weight orthoester, or an aprotic low molecular weight acetal compound.

19. The process as claimed in claim 1, wherein the deactivation agent is a compound of formula (V):

$$R^1COR^2 \quad (V)$$

wherein $R^1$ and $R^2$ are each independently a $C_1$-$C_6$ alkyl group, or $R^1$ and $R^2$ taken together with the C atom they are attached to form a 5-8 membered ring.

* * * * *